United States Patent [19]

Shoff et al.

[11] Patent Number: 5,758,258
[45] Date of Patent: May 26, 1998

[54] SELECTIVE DELIVERY OF PROGRAMMING FOR INTERACTIVE TELEVIDEO SYSTEM

[75] Inventors: Daniel J. Shoff, Issaquah; Joseph H. Matthews, III, Redmond, both of Wash.

[73] Assignee: Microsoft Corporation, Redmond, Wash.

[21] Appl. No.: 517,139

[22] Filed: Aug. 21, 1995

[51] Int. Cl.$^6$ .................................. H04N 7/10; H04H 1/00
[52] U.S. Cl. .............................. 455/5.1; 348/5.5; 348/10; 348/12; 455/6.2
[58] Field of Search .................... 348/5.5, 6, 10, 348/12, 13, 7, 906, 461, 469, 473, 476–479; 455/3.1, 4.1, 4.2, 5.1, 6.1, 6.2; H04N 7/10, 7/14, 7/16, 7/173

[56] References Cited

U.S. PATENT DOCUMENTS

| | | |
|---|---|---|
| 4,081,754 | 3/1978 | Jackson . |
| 4,225,884 | 9/1980 | Block et al. . |
| 4,228,543 | 10/1980 | Jackson . |
| 5,038,211 | 8/1991 | Hallenbeck . |
| 5,063,610 | 11/1991 | Alwadish . |
| 5,583,576 | 12/1996 | Perlman et al. ............... 348/906 |

*Primary Examiner*—Mark R. Powell
*Assistant Examiner*—John W. Miller
*Attorney, Agent, or Firm*—Klarquist Sparkman Campbell Leigh & Whinston, LLP

[57] ABSTRACT

The present invention includes a method of selectively delivering programming to a viewer station on an interactive television or televideo (IT) system. Determinations as to whether programming is to be delivered are based upon the content or service level of the programming. With reference to content-based delivery of programming, the IT system identifies predetermined characteristics of the available programming. Each viewer at a selected viewer station is assigned a personal programming service level. The personal programming service level of each viewer is related to the particular characteristics and distinguishes appropriate and inappropriate programming for the viewer. The IT system compares the predetermined characteristics of the programming available at a time with the appropriate programming service level. The IT system delivers to the viewer station the available programming with predetermined characteristics that conform to the appropriate viewer service level.

16 Claims, 4 Drawing Sheets

SELECTIVE DELIVERY OF PROGRAMMING FOR INTERACTIVE TELEVIDEO SYSTEM

FIELD OF THE INVENTION

The present invention relates to interactive television or televideo systems and, in particular, to a method of providing to a subscriber a selective level of televideo programming suitable for viewers that are associated with the subscriber and receive the programming.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, IT systems under development could include the equivalent of 500 channels of programming, including video broadcasting and applications.

The availability of large amounts of interactive television programming is expected to include a wide variety of programming types and subject matter. With diverse viewer tastes and interests, some programming types or subject matter may be considered objectionable or inappropriate for some viewers. Within a household for example, parents may wish to prevent minor children from viewing certain programming. Alternatively, the adults in a household may wish to prevent certain types of programming from being delivered at all.

Conventional television systems allow reception of programming to be restricted mainly in two ways: channel blocking and time lockouts. A subscriber may block a channel from being delivered to the subscriber's viewing station (e.g., household). A channel may be blocked permanently by not including it in the services subscribed. A channel may be blocked temporarily until an access code is delivered to the television service provider (e.g., by telephone) to activate the channel, as in the case of pay-per-view television programming.

A conventional television receiver can be fitted with a time-based lockout system that prevents operation of the receiver at pre-programmed times. Time lockouts are sometimes used, for example, to prevent minor children from watching television at selected times.

Channel blocking and time lockouts may be appropriate for controlling reception of programming in some circumstances. However, both channel- and time-based methods of controlling programming reception suffer from disadvantages, particularly in an IT system having a wide variety of programming.

A viewer must decide to impose channel blocking on a channel-by-channel basis. In an IT system with potentially hundreds of channels, such channel-by-channel determinations could be extremely burdensome for many viewers. Moreover, channel blocking is indiscriminate as to the programming actually carried on a channel and can prevent a viewer from receiving desired programming that is intermixed with or replaces the undesired programming.

Time lockouts are disadvantageous because they too are indiscriminate in operation. A time lockout prevents all viewers at a viewer station from receiving programming during the lockout periods, but allows all viewers at a station to receive all programming outside the lockout periods.

SUMMARY OF THE INVENTION

The present invention includes a method of selectively delivering programming to a viewer station on an interactive television or televideo (IT) system. The IT system includes a central control node that delivers programming to multiple subscribers or viewers. Each viewer has a video display set (e.g., a television receiver) and an associated interactive controller that is responsive to input from the viewer for controlling programming on the video display set.

The method of this invention includes selectively delivering programming to a particular viewer station (e.g., a household), such as one with multiple viewers (e.g., a family). Delivery of programming refers to making it available to or accessible by a viewer.

Programming is selectively delivered automatically according to which, if any, of multiple viewers at the viewer station is identified as receiving the programming. Determinations as to whether programming is to be delivered are based upon the content or service level of the programming, rather than solely the channel or network carrying the programming or the time at which the programming is transmitted.

With reference to content-based delivery of programming, the IT system identifies predetermined characteristics of the available programming. For example, the particular characteristics could include a rating of the type assigned by the Motion Picture Association of America to motion pictures (i.e., G, PG, PG-13, R, NC-17, or X). Each viewer at a selected viewer station is assigned a personal programming service level. The personal programming service level of each viewer is related to the particular characteristics and distinguishes appropriate and inappropriate programming for the viewer.

When viewing or receiving programming from the IT system, each viewer at a viewer station or household may enter an identifier such as a personal identification code or number (PIN) corresponding to the viewer. Whenever one or more viewers at a viewer station is identified, the IT system determines the personal programming service levels for each of the viewers. Based on the personal programming service levels, the IT system selects an appropriate programming service level representing programming that is appropriate for all the identified viewers. For example, the appropriate programming service level may be the same as the most restrictive of the personal programming service levels.

Whenever no viewer at a viewer station is identified, the IT system identifies a default programming service level assigned to the selected viewer station. Preferably, the default programming service level corresponds to the most restrictive of the personal programming service levels of the viewers associated with the viewer station.

The IT system compares the predetermined characteristics of the programming available at a time with the appropriate programming service level or the default programming service level, if no viewer is identified. The IT system delivers to the viewer station the available programming with predetermined characteristics that conform to the appropriate viewer service level or the default programming service level.

In addition or alternatively to predetermined characteristics reflecting programming content, the programming service levels can restrict different viewers to different classes of programming. The different classes of programming may be of different content types or may relate to different types of IT system services.

This invention selectively delivers programming appropriate for all identified viewers at a viewer station. Identification of appropriate programming may be based upon the programming content. In an IT system with up to about 500 channels, a viewer is spared a significant effort in determining the suitability of each of the channels. Moreover, programming appropriate for all viewers associated with a viewer station may be delivered automatically even in the absence of specific identification of viewers.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 1:
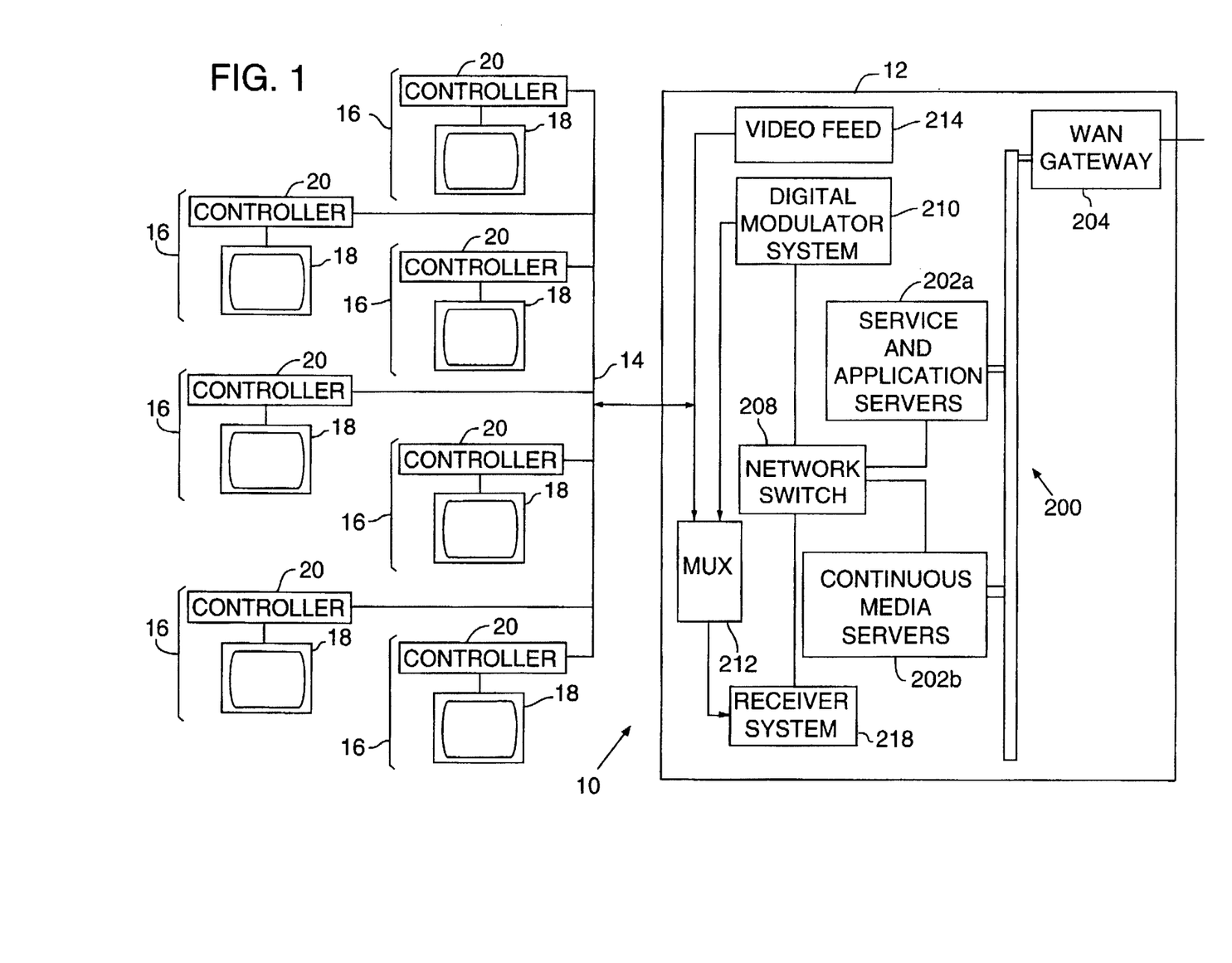
FIG. 1 is a block diagram of an interactive television system used for the preferred embodiment of this invention.
Figure 2:
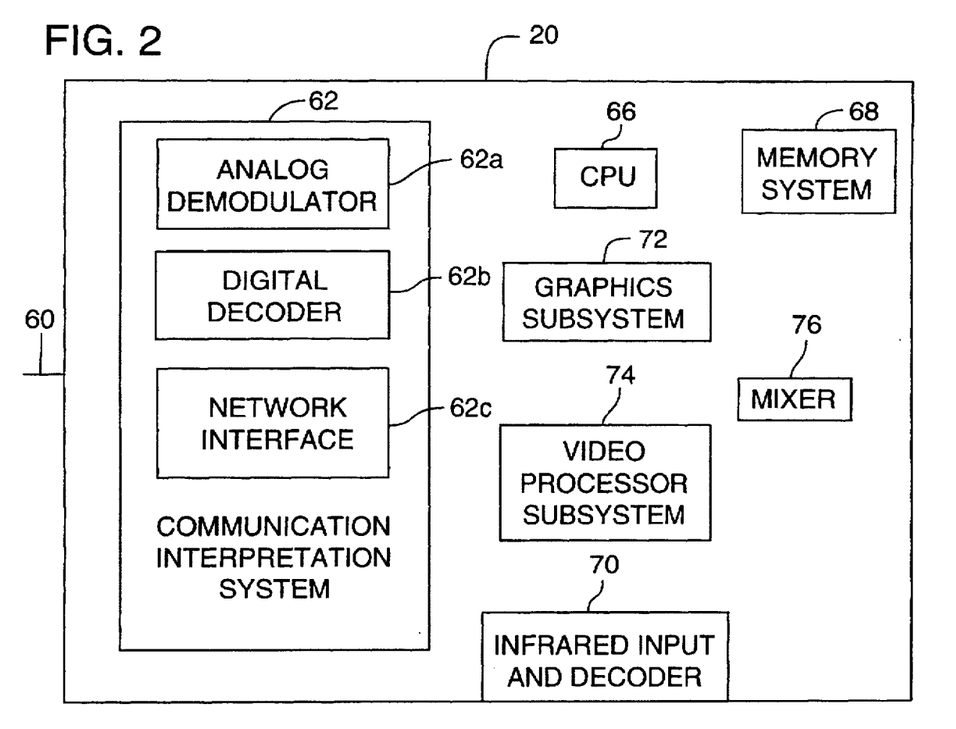
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18. Moreover, any viewer station 16 can include multiple interactive station controllers 20.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20, as described below in greater detail.

Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control mode 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes an input 60 that delivers communication or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control mode 12 at input 60. Video decoder 62b functions as a digital equivalent of demodulator 62a for selecting one of multiple digital video signals received at input 60 from central control mode 12. Network communication interface 62c communicates with central control mode 12 with digital information carried over baseband frequencies. The baseband frequencies may be below the conventional analog video signal frequencies, above the digital video signal frequencies, or between the frequencies of analog or digital signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 3) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, including interactive system user interface images, on video display set 18. A video processor subsystem 74, also controlled by CPU 66, provides control in the rendering of video imagery, including decompressing digital video signals and sizing and positioning a video display window.

A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3:
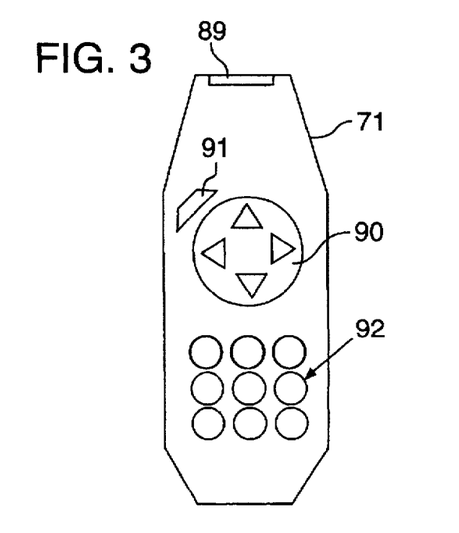
FIG. 3 is a plan diagram of a viewer control unit for providing viewer input to the interactive station controller of FIG. 2.

Referring to FIG. 3, viewer control unit 71 includes an infrared transmitter window 89 through which control unit 71 emits infrared signals to infrared input 70 of station controller 20. A directional control keypad 90 allows a viewer to transmit signals to station controller 20 according to displays it renders on the video display set 18. The viewer may initiate or activate selections by depressing an action key 91 and may enter numeric values with numeric key pad 92.

Figure 4:
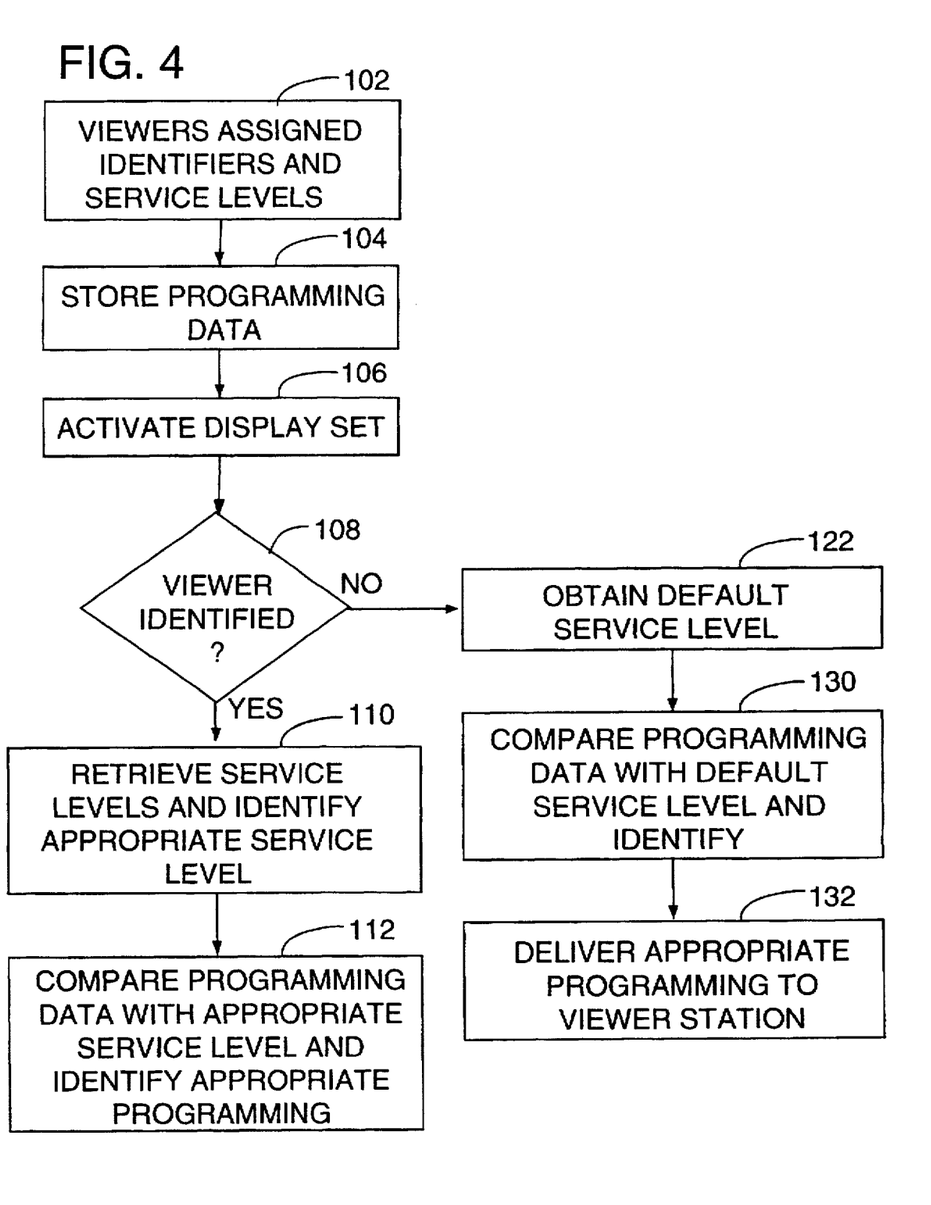
FIG. 4 is a flow diagram of a method of selectively delivering programming to a selected viewer station according to the present invention.

FIG. 4 is a flow diagram showing a method of delivering to a particular viewer station 16 programming having predetermined characteristics according to the viewer or viewers identified as receiving the programming. Delivery of programming refers to making it available to or accessible by a viewer.

The predetermined characteristics may relate to the content of programming and whether it is included in predefined classes of programming. The programming may include conventional video broadcasting or computer-executed applications, including games, information retrieval, and communications. The applications may be executed by processors located at central control node 12, station controller 20, or by cooperation between processors at both locations.

Process block 102 indicates that each viewer associated with a selected viewer station 16 is assigned a viewer identifier such as, for example, a personal identification number (PIN). The viewer identifier for each viewer is stored by IT system 10 in, for example, a service level database at central control node 12. It will be appreciated, however, that the viewer identifier could alternatively be implemented with a variety of current or future identification technologies including voice identification, finger or thumb print identification, or visual analysis of facial features. The benefits of such identification technologies is that they reduce or eliminate the effort required of a viewer to be identified by IT system 10 or its components.

In addition, each viewer associated with selected viewer station 16 is assigned a personal programming service level. The personal programming service level of each viewer is related to particular characteristics of the programming, such as its content or inclusion in a predefined class of programming. The personal programming service levels determine appropriate programming for each of the viewers. Additional or alternative characteristics or criteria could be used.

The content-based characteristics can include a rating of the type assigned to motion pictures by the Motion Picture Association of America (i.e., G, PG, PG-13, R, NC-17, or X, or NR if not rated), or a similar ordered rating or an unordered rating. The predefined classes of programming can relate to different types of services or programming provided by IT system 10 and may be referred to as Basic, Premium 1, or Premium 2 services.

As an example, Basic services may include mainly standard broadcast television programming. Premium 1 services may include expanded motion picture programming of the type provided by Home Box Office, Showtime or the Movie Channel, for example. Premium 2 services may include pay-per-view programming or other restricted access programming.

Table 1 represents exemplary personal programming service levels that could be assigned to viewers associated with a selected viewer station 16. For purposes of illustration, the selected viewer station 16 is assumed to be a household with two adult parents, a teenage minor child, and a pre-teenage child.

TABLE 1

Personal Programming Service Levels (Example)

| Program Criterion | Pre-Teen Child | Teen Child | Parents | Default |
|---|---|---|---|---|
| Service Classes | Basic | Basic + Premium 1 | Basic + Premium 1 + Premium 2 | Basic |
| Maximum Content Rating | PG and not NR | R and not NR | None | PG-13 and not NR |

Table 1 shows that the different viewers of the selected viewer station 16 have different personal programming service levels relating to the classes and content of programming. The personal programming service levels relating to service classes are represented as a cumulative listing of service classes available to the viewers. The personal programming service levels relating to content ratings are represented as maximum ratings that are the least restrictive ratings appropriate for the viewers. The default programming service level is described below.

The content- and class-based personal programming service levels may be used independently or together. The following description is directed to using the different types of personal programming service levels together, but would be similarly applicable to using the different types independently.

The parent viewers are assigned unrestricted content-based personal programming service levels. The teenage child is assigned a content-based personal programming service level of R and not NR, which allows the teenage child to receive programming that is rated R or more restrictively (i.e., G, PG, or PG-13). The pre-teenage child is assigned a content-based personal programming service level of PG and not NR, which allows the pre-teenage child to receive programming that is rated PG or more restrictively (i.e., G). Neither child is allowed to receive unrated programming (i.e., NR).

Process block 104 indicates that programming data representing predetermined characteristics of programming scheduled for transmission over IT system 10 is stored in central control node 12. The predetermined characteristics include content- and class-based characterizations corresponding to those assigned to the viewers. Alternative or additional characterizations could be used. The programming data preferably are included in an electronic programming guide (EPG) database at central control node 12.

Process block 106 indicates that one of the viewers at the selected viewer station 16 activates the viewer display set 18 to receive programming from IT system 10. Viewers who are present and will receive the programming and invited to enter identifying PINs. The invitation is generated, for example, by interactive station controller 20. Identified viewers may be requested periodically to reenter their PINs to assure that the identification of the viewers continues to be correct.

Decision block 108 represents an inquiry as to whether any viewer associated with the selected viewer station 16 has been identified by IT system 10. IT system 10 identifies a viewer whenever his or her PIN is entered into interactive station controller 20. Decision block 108 proceeds to process block 110 whenever one or more viewer identifiers are received and otherwise proceeds to process block 122.

Process block 110 indicates that IT system 10 determines or retrieves the personal programming service levels assigned to the identified viewers and identifies from them an appropriate programming service level for the viewers. The appropriate programming service level may be selected as the most restricted programming viewer service level of the identified viewers or by some other common relationship between the personal programming service levels of the identified viewers. This operation may be performed by central control node 12 or by interactive station controller 20 with the results transmitted to central control node 12.

An appropriate programming service level is identified as viewers are identified or indicate they are no longer receiving the programming (e.g., log-off) according to a selected procedure. An appropriate programming service level also may be determined periodically if less than all the identified viewers reenters their PINs when invited to do so.

Process block 112 indicates that IT system 10 compares the predetermined characteristics of the available programming with the appropriate programming service level to identify appropriate programming for delivery to the selected viewer station 16. This is preferably performed within central control node 12, either for each programming request or as a batch determination for all available programming.

In an alternative embodiment, the programming data described with reference to process block 104 may alternatively be imbedded in or transmitted with the programming as real-time programming data. The comparison step of process block 112 may be made with reference to the stored programming data or the real-time programming data at central control node 12, the selected viewer station 16, or at both locations. As one example, the stored and real-time programming data could be used in connection with scheduled and unscheduled programming, respectively.

Figure 5:
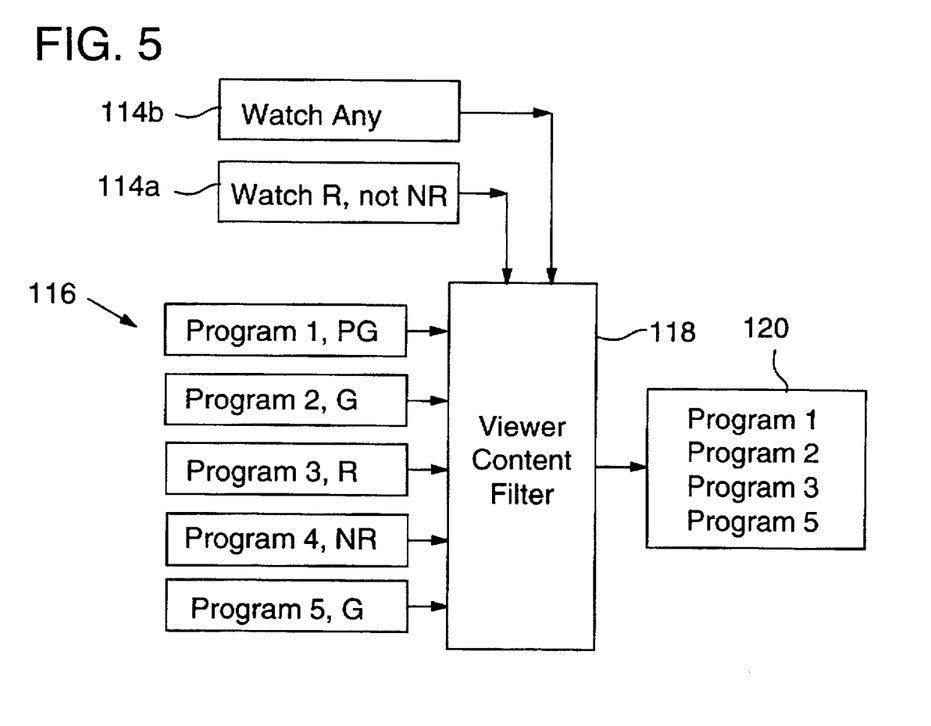
FIG. 5 is a functional block diagram representing identification of appropriate programming in accordance with the method of FIG. 4.

FIG. 5 is a functional block diagram representing the operations of process blocks 110 and 112 with reference to content-based personal programming service levels and two of the viewers represented by Table 1. Functional blocks 114a and 114b represent the content-based personal programming service levels of the identified viewers. Functional block 114a represents the R rating for and the exclusion of unrated programming from the teen-age child. Functional block 114b represents the unlimited rating of one of the adult parents.

Functional blocks 116 represent the predetermined characteristics of exemplary available programs 1, 2, 3, 4, and 5 with the respective characteristics PG, G, R, NR, and G. Functional block 118 represents the determination of the appropriate programming service level and the comparison of it with the predetermined characteristics of the available programming. Functional block 120 represents the identification of the appropriate programming as programs 1, 2, 3, and 5. Program 4 is not appropriate programming because it is unrated and does not conform to the personal programming service level of the teenage child.

Process block 122 indicates that IT system 10 determines or retrieves a default viewer service level associated with the selected viewer station 16. The default viewer service level preferably corresponds to the most restricted programming viewer service level of a viewer associated with the selected viewer station 16.

Figure 6:
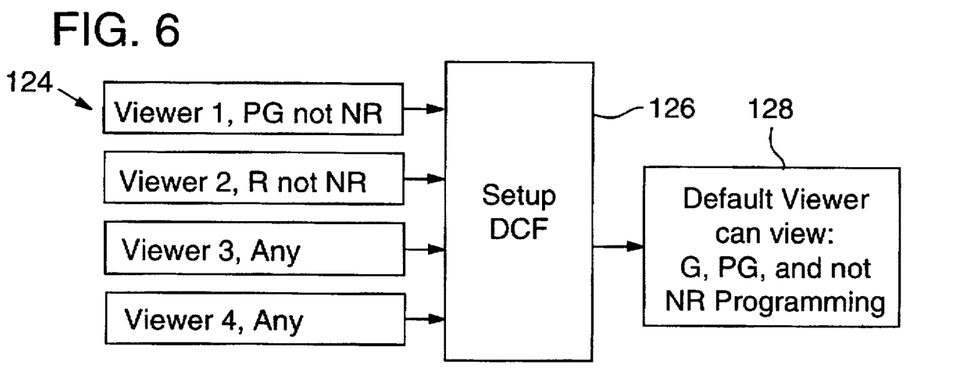
FIG. 6 is a functional block diagram representing determination of a default viewer service level in accordance with the method of FIG. 4.

FIG. 6 is a functional block diagram representing the operation of process block 122 with reference to content-based personal programming service levels and the viewers represented by Table 1. Functional blocks 124 represent the content-based personal programming service levels of all viewers associated with the selected viewer station 16. Functional block 126 represents determination of the default viewer service level or default content filter from the content-based personal programming service levels of the viewers. In this example, the default programming service level corresponds to the personal programming service level of viewer 1, the pre-teenage child.

Functional block 128 represents the identification of the default viewer service level as allowing G and PG rated programs and not unrated programs. As described above, the default content viewer level corresponds to the most restrictive of the personal programming service levels. Alternatively, the default content viewer level could be some other greatest common aspect of the personal programming service levels.

Process block 130 indicates that IT system 10 compares the predetermined characteristics of the available programming with the default programming service level to identify programming deliverable to the selected viewer station 16.

Process block 132 indicates that the deliverable programming is delivered to the selected viewer station 16.

The method of FIG. 4 is described with reference to receiving programming in the form of, for example, a motion picture. The programming available from IT system 10 could also be computer-executed applications, including customer service applications by which a viewer at the selected viewer station 16 controls aspects of services or programming provided by IT system 10. It will be appreciated, therefore, that selective delivery of programming in accordance this invention can include allowing different viewers at the selected viewer station 16 can have different levels of access to programming in the form of computer-executed applications.

One application for which selective delivery or access to programming in the form of an application could include a customer service application. With regard to this type of application, viewers at the selected viewer station 16 could be assigned the designations Subscriber, General, or Default. A Subscriber viewer would typically be the person responsible for the IT system account associated with the selected station 16 (e.g., household). A General viewer would typically be any other viewer associated with the selected viewer station 16. A Default viewer could correspond to any viewer not associated with the selected viewer station 16 (e.g., unidentified viewers).

The Subscriber viewer access to the application allows the viewer to control the subscription or billing arrangements associated with the selected viewer station 16, define the personal programming service levels for all viewers associated with the selected station 16, and affect other system-related attributes or services. The Subscriber could access and interact with such applications with viewer control unit 71 in cooperation with displays rendered on video display set 18 by interactive station controller 20. Preferably, only one viewer at the selected viewer station would be designated the Subscriber viewer.

The General viewers can each have the same or different levels of access to particular programming applications.

similar to the manner in which the personal programming service levels allow access to different types of programming. The General viewers would, however, have only restricted access to some applications relative to the Subscriber viewer. A Default viewer would have no more access, and possibly less access, than the most restricted of the General viewers.

This invention has been described with reference to a preferred automatic method of selectively delivering IT system programming. A benefit of such an embodiment is that it provides selective delivery of programming in a manner that is transparent to viewers. It will be appreciated, however, that this invention alternatively could provide viewers with programming service level information in response to explicit information requests from the viewers.

In an alternative embodiment, a viewer could request from IT system 10 programming data of the type described with reference to FIG. 4 and process block 104. The viewer (e.g., a parent) could request information about the class or content of a specific program (e.g., a program that is available at a future time) or could request for a specific time a listing of programming of a specified class or with specified content. Such programming data requests in IT system 10 could be made independently of requests for programming.

For example, such programming data requests can be made through a viewer interface generated by an electronic programming guide application available from IT system 10. As another alternative, a viewer could make such programming data requests over a telephone network distinct from IT system 10, either by voice or with a computer independent of station controller 20. This latter alternative would be applicable to IT system 10 as well as conventional television networks.

Referring to FIG. 1 central control node 12 includes a digital local area network (LAN) 200 with multiple computer servers 202 for performing various interactive system applications or functions referred to above. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information.

Servers 202 may include, for example, service and application servers 202a and continuous media servers 202b. Service and application servers 202a process interactive service requests from subscribers and provide services and applications associated with operation of IT system 10. Service and application servers 202a may be dedicated to particular applications such as an electronic programming guide for viewers, network security, monitoring, object storage, financial transactions, data access, and other administration functions.

Continuous media servers 202b provide storage and on-demand or near on-demand delivery of digitized video information. The digitized video information can include video programming of substantially any duration ranging from individual image frames and brief video clips to full-length motion pictures.

Servers 202 communicate with station controllers 12 via a network communication switch 208, such as an asynchronous transfer mode (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents thereto.

We claim:

1. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of selectively delivering programming to a selected viewer station, comprising:

identifying a predetermined characteristic of programming available from the interactive televideo system;

identifying a selected viewer associated with the selected viewer station and a personal programming service level assigned to the selected viewer;

comparing the predetermined characteristic of the available programming to the personal programming service level assigned to the selected viewer; and delivering the available programming to the selected viewer station only if the predetermined characteristic of the available programming conforms to the personal programming service level assigned to the selected viewer.

2. The method of claim 1 in which identifying the selected viewer includes obtaining a viewer identifier that represents the selected viewer and indicates that the selected viewer is engaged with the selected viewer station.

3. The method of claim 1 in which identifying the selected viewer includes detecting an absence of any viewer identifier indicating that no viewer is identified as engaged with the selected viewer station and retrieving a default viewer identifier representing the selected viewer.

4. The method of claim 3 in which plural viewers are associated with the selected viewer station, each of the viewers having assigned to them one of at least first and second personal programming service levels, the first personal programming service level restricting access to programming allowed to the second personal programming service level, the first personal programming service level being assigned to the selected viewer.

5. The method of claim 1 in which the programming includes a system service application for controlling delivery of programming to the selected viewer station, in which plural viewers are associated with the selected viewer station, each of the viewers having assigned to them one of at least first and second personal programming service levels, the first personal programming service level restricting access to the system service application which access is allowed to the second personal programming service level.

6. The method of claim 1 in which the predetermined characteristic and the personal programming service level relate to at least one of programming content or programming classification.

7. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of selectively delivering programming to a selected viewer station, comprising:

identifying a predetermined characteristic of programming available from the interactive televideo system;

identifying a default programming service level assigned to the selected viewer station;

comparing the predetermined characteristic of the available programming with the default programming service level assigned to the selected viewer station;

delivering to the viewer station the available programming with predetermined characteristic that conform to the default viewer programming service level assigned to the selected viewer station.

8. The method of claim 7 in which plural viewers are associated with the selected viewer station, each of the viewers having assigned to them one of at least first and second personal programming service levels, the first personal programming service level restricting access to programming allowed to the second personal programming service level, and in which the default viewer programming service level assigned to the selected viewer station is the first personal programming service level.

9. The method of claim 7 in which plural viewers are associated with the selected viewer station, each of the viewers having assigned to them a viewer identifier, the method further including detecting an absence of any viewer identifier indicating that no viewer has been identified at the viewer station.

10. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, plural viewers being associated with a selected viewer station, a memory associated with the interactive televideo system, comprising:

a personal programming service level stored in the memory for each of the viewers associated with the selected viewer station, the personal programming service levels corresponding to the programming available to the viewers.

11. The memory of claim 10 in which the viewer programming service levels stored in the memory for the viewers include at least one each of first and second personal programming service levels, the first personal programming service level restricting access to programming allowed to the second personal programming service level.

12. The memory of claim 10 further comprising programming classifications stored in the memory and characteristic of programming available from the interactive televideo system, the programming classifications relating to the personal programming service levels stored in the memory.

13. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of delivering programming information to a selected viewer station, comprising:

identifying predetermined content characteristics of programming available from the interactive televideo system, the predetermined content characteristics being represented by multiple classes;

receiving from a viewer a programming characterization request relating to at least a class and the programming available from the interactive televideo system; and providing the viewer a programming characterization of the programming available from the interactive televideo system relating to at least the class.

14. The method of claim 13 in which the programming characterization request includes a request for programming that conforms to a specified class and the method further comprises comparing the classes of the predetermined content characteristics of the available programming with the specified class and identifying for the viewer the available programming in which the predetermined content characteristics conform to the specified class.

15. The method of claim 14 further comprising receiving from the viewer a specified programming time, comparing the classes of the predetermined content characteristics of the available programming at the specified time with the specified class, and identifying for the viewer the available programming at the specified time in which the predetermined content characteristics conform to the specified class.

16. The method of claim 13 in which the programming characterization request includes a request for the classes of programming that is available at a specified time and the method further comprises identifying for the viewer the classes of the programming available at the specified time.

* * * * *